United States Patent
Kassai et al.

(10) Patent No.: US 6,938,914 B2
(45) Date of Patent: Sep. 6, 2005

(54) BABY CARRIAGE

(75) Inventors: Kenzou Kassai, Osaka (JP); Hiroyasu Yamamoto, Osaka (JP)

(73) Assignee: Aprica Kassai Kabushikikaisha, Osaka (JP)

(*) Notice: Subject to any disclaimer, the term of this patent is extended or adjusted under 35 U.S.C. 154(b) by 13 days.

(21) Appl. No.: 10/656,724

(22) Filed: Sep. 4, 2003

(65) Prior Publication Data

US 2004/0061312 A1 Apr. 1, 2004

(30) Foreign Application Priority Data

Sep. 30, 2002 (JP) ........................................ 2002-284816

(51) Int. Cl.⁷ ................................................ B62B 1/00
(52) U.S. Cl. ........................ 280/642; 280/647; 280/658; 297/350
(58) Field of Search ................................ 280/642, 650, 280/641, 643, 646, 42, 647, 651, 652, 657, 658, 47.36, 47.39, 47.38; 297/350, 377, 380

(56) References Cited

U.S. PATENT DOCUMENTS

| 4,435,012 A | 3/1984 | Kassai |
| 4,577,355 A | 3/1986 | Kassai |
| 4,597,116 A | 7/1986 | Kassai |
| 4,805,928 A * | 2/1989 | Nakao et al. ................ 280/642 |
| 5,018,754 A * | 5/1991 | Cheng ......................... 280/644 |
| D352,923 S | 11/1994 | Kassai |
| 5,490,685 A | 2/1996 | Kitayama et al. |
| 5,562,330 A * | 10/1996 | Jane Cabagnero .......... 280/644 |
| 5,681,084 A | 10/1997 | Yoneda |
| 5,685,605 A | 11/1997 | Kassai et al. |
| 5,752,738 A | 5/1998 | Onishi et al. |
| 6,561,536 B2 * | 5/2003 | Suzuki ........................ 280/642 |

FOREIGN PATENT DOCUMENTS

| JP | 7-004248 | 1/1995 |
| JP | 08-175394 | 7/1996 |
| JP | 2002-220060 | 8/2002 |

* cited by examiner

*Primary Examiner*—Hau Phan
(74) *Attorney, Agent, or Firm*—W. F. Fasse; W. G. Fasse

(57) ABSTRACT

A baby carriage comprises longitudinal side frame members, a backrest sheet portion, a head protection part positioned at an upper end region of the backrest sheet portion, a backside support connected to the longitudinal side frame member to reclinably support the backrest sheet portion from a backside, and a guard member of a rigid structure having an inverted U shape as a whole. The guard member has both ends rotatably connected to the longitudinal side frame members and a central portion extending in the width direction and positioned along a back surface of the head protection part in both forms of a chair state and a bed state.

8 Claims, 14 Drawing Sheets

BABY CARRIAGE

BACKGROUND OF THE INVENTION

1. Field of the Invention

The present invention relates to a baby carriage and more particularly, it relates to a baby carriage which can be changed to a form of a backside pushing state or to a form of a face-to-face pushing state and also can take a form of a bed state.

2. Description of the Background Art

Japanese Utility Model Laid-Open Gazette No. 7-4248 discloses a lightweight-type baby carriage in which a hammock is provided on a body frame. A backrest portion of the hammock is supported by a belt member from the backside thereof and a reclined angle of the backrest portion can be changed by adjusting a length of the belt. This kind of baby carriage can be lightened by making a reclining structure of the backrest portion very simple.

A baby carriage is generally provided with a crotch belt and a waist belt for restraining a baby on a seat. These belts prevent the baby from falling out of the seat forward and sideward.

Japanese Patent Laid-Open Gazette No. 8-175394 discloses a baby carriage in which a backrest portion is largely reclined to take a form of a bed state. In the bed state, a head guard part positioned above the backrest portion rises from an upper end of the backrest portion so as to protect a baby's head. In addition, according to the baby carriage disclosed in this gazette, it is folded by reducing a dimension in a width direction.

Japanese Patent Laid-Open Gazette No. 2002-220060 discloses a baby carriage provided with a push rod which can be changed to be in a backside pushing state or to be in a face-to-face pushing state.

In a case of the lightweight-type baby carriage disclosed in Japanese Utility Model Laid-Open Gazette No. 7-4248, an upper portion of a seat, that is, an upper portion of the backrest portion of the hammock is opened. Although the crotch belt and the waist belt are effective in preventing the baby from falling out forward and sideward, it is not so effective in preventing the baby from falling out upward.

Especially, in a baby carriage which can take a form of a bed state by largely reclining a backrest portion, it is an anxious matter that the baby falls out upward in the bed state (falling head down by moving upwardly along the backrest portion).

It is said that a brain of a baby is developed most well from seven months old in the womb to three years old. Therefore, it is very important to protect a baby's head in the child-care instrument for holding especially a baby.

According to the baby carriage disclosed in the Japanese Patent Laid-Open Gazette No. 8-175394, since the head guard part rising from the upper end of the backrest portion is provided in the bed state, the head of the baby can be protected to some extent.

According to a baby carriage which can be changed to be in a backside pushing state or to be in a face-to-face pushing state and also can take a form of a bed state, when the seat is in the bed state and the push rod is in the face-to-face pushing state, a head of a baby is positioned at the very front in the direction of movement. Even in the case where there is provided the head guard part disclosed in the Japanese Patent Laid-Open Gazette No. 8-175394, when the head guard part crushes against an obstruction, the head of the baby may be damaged.

Even in the backside pushing state, when the seat is in the bed state, since the upper part of the backrest portion, that is, the part which supports the head of the baby largely protrudes backward in the direction of movement, a knee of a person who moves the baby carriage may hit against the upper part of the backrest portion or the head guard part. As a result, there is a risk of giving a shock to the head of the baby.

SUMMARY OF THE INVENTION

It is an object of the present invention to provide a baby carriage which can sufficiently protect a head of a baby in a form of a bed state.

The present invention premises a baby carriage which can be changed to be in a form of a chair state in which a backrest portion and a head protection part positioned above it extend on the same plane or to be in a form of a bed state in which the head protection part rises upward from the backrest portion. A baby carriage according to the present invention comprises a body frame and a guard member. The guard member is composed of a rigid structure having an inverted U shape as a whole and its both ends are rotatably connected to the body frame. A central portion of the guard member extends in the width direction of the baby carriage. The central portion is positioned along the back surface of the head protection part in both forms of the chair and the bed states.

According to the baby carriage of the above structure, since the U-shaped guard member formed of a rigid structure is positioned around the both top and temporal portions of the head of a baby in the form of the bed state, the head of the baby can be sufficiently protected.

According to a preferred embodiment, a body frame includes a seating surface support member and a pair of longitudinal side frame members upwardly extending from both sides at a rear end region of the seating surface support member. Both ends of a guard member are rotatably connected to the pair of longitudinal side frame members. Therefore, a central portion of the guard member can be positioned along a back surface of the head protection part in both forms of a chair and a bed states.

Furthermore, according to a preferred embodiment of the present invention, a baby carriage comprises a seat hammock, a backside support and a guard connecting member. The seat hammock includes a seating surface sheet portion extending on the seat surface support member and a backrest sheet portion connected to a rear edge of the seating surface support member and extending between a pair of longitudinal side frame members. The backside support is connected to a body frame so as to reclinably support a backrest sheet portion from the backside. The guard connecting member connects a backside of an upper region of the backrest sheet portion which is to be a head protection part to a central portion of a guard member. The backside support includes a backside string member extending along the whole length of the backrest sheet portion on the backside in the width direction and having both ends connected to the pair of longitudinal frame members, for example. Thus, according to such a baby carriage, since a reclining structure of the backrest sheet portion becomes simple, its weight can be lightened.

A baby carriage may comprise a push rod having lower ends rotatably connected to a body frame such that it can be changed to be in a backside pushing state or to be in a face-to-face pushing state. In this baby carriage also, a guard member sufficiently protects a head of a baby in the face-to-face pushing state and in the form of the bed.

A guard member may preferably include a pair of side bars having end portions rotatably connected to a body frame and a lateral bar having both ends connected to the pair of side bars. The lateral bar has a flat configuration which is long in the extending direction of the side bars. According to such a guard member, since the flat lateral bar positioned at the back surface of a head protection portion has a large width dimension part extending in the horizontal direction, it shows sufficient strength to the impact in the forward and backward directions.

A baby carriage may have a structure of shrinking in the width direction to be folded. In this case, a guard member includes a pair of side bars having end portions rotatably connected to a body frame and a lateral bar having both ends connected to the pair of side bars. The lateral bar of the guard member includes a pair of end link members rotatably connected the pair of side bars and a central link member having both ends rotatably connected to the pair of end link members in order to enable the baby carriage to be folded by shrinking in the width direction. Preferably, the end link members constitute a four-section chain mechanism which moves the central link member in parallel along the back surface of the head protection part. The folding operation of the baby carriage can be stabled by using the parallel four-section chain mechanism.

DETAILED DESCRIPTION OF THE PREFERRED EMBODIMENTS

Hereinafter, an embodiment of the present invention will be described with reference to the accompanying drawings.

Figure 1:
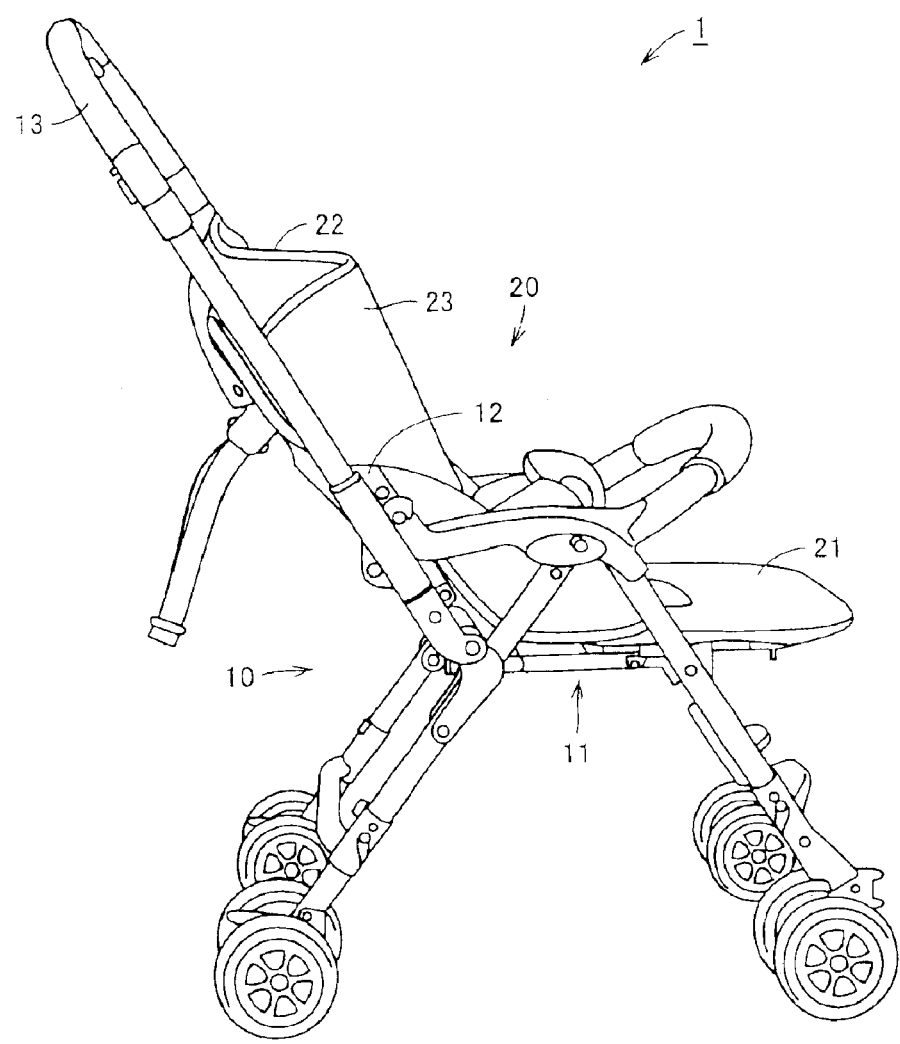
FIG. 1 is a side view showing a baby carriage according to an embodiment of the present invention and shows a backside pushing state in a form of chair.
Figure 2:
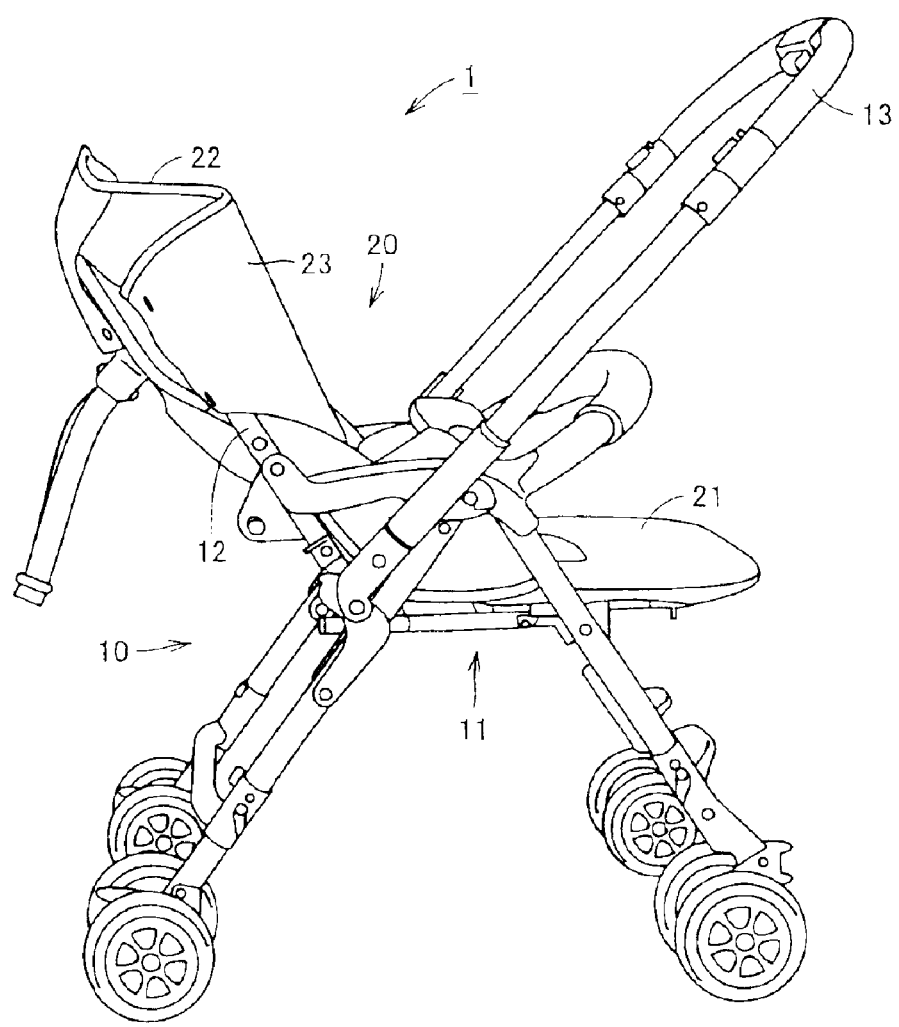
FIG. 2 is a side view showing the baby carriage and shows a face-to-face pushing state in the form of the chair.
Figure 3:
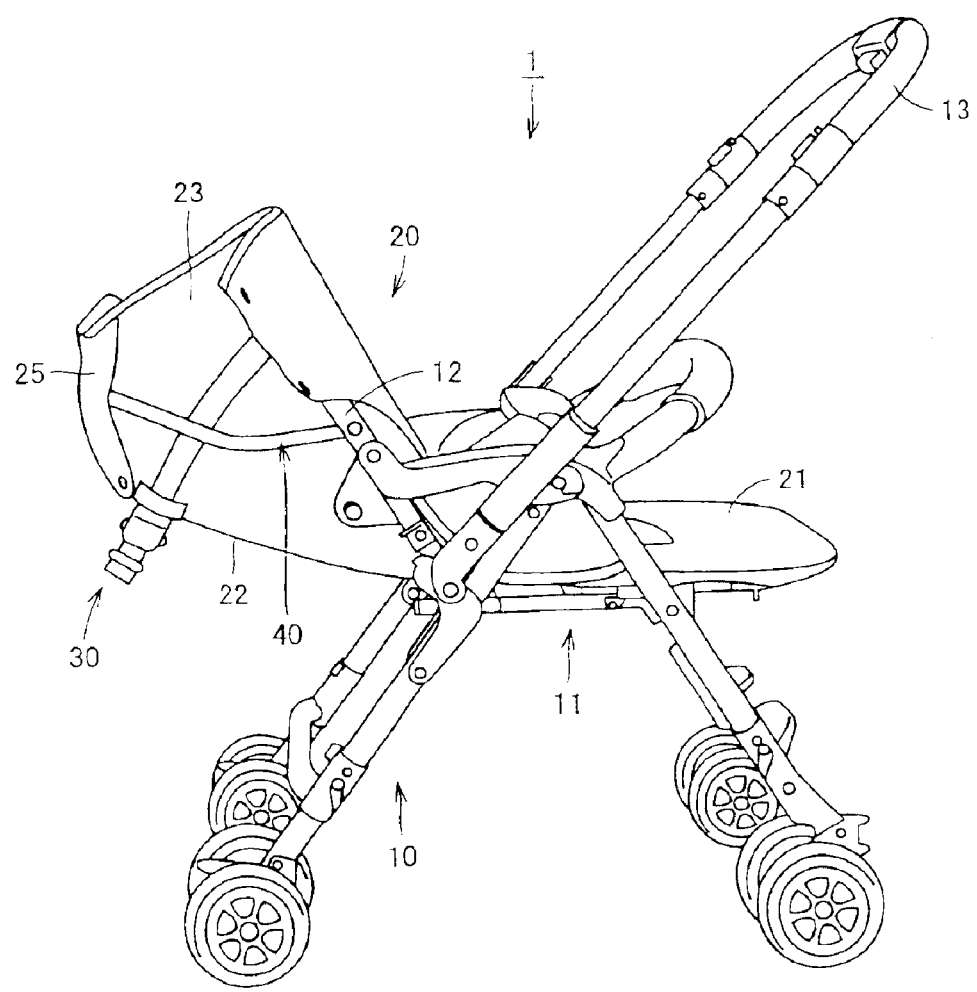
FIG. 3 is a side view showing the baby carriage and shows the face-to-face pushing state in a form of a bed.
Figure 4:
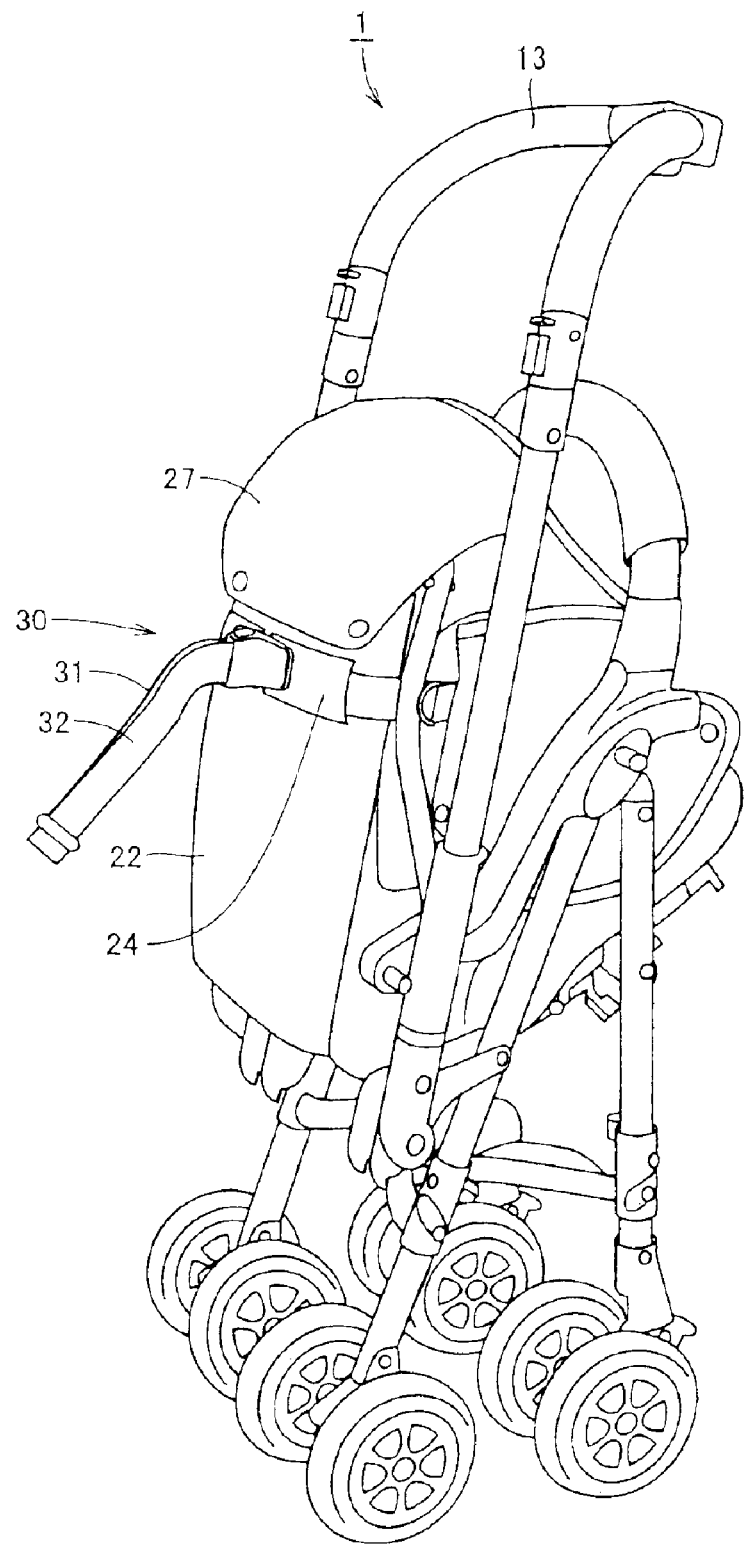
FIG. 4 is a perspective view showing the baby carriage in a folded state.

An illustrated baby carriage 1 can take forms shown in FIGS. 1 through 3 in its used state. FIG. 1 shows a form in which the baby carriage is pushed from the backside in the form of a chair state. FIG. 2 shows a form in which the baby carriage is pushed face-to-face in the form of the chair state. FIG. 3 shows a form in which the baby carriage is pushed face-to-face in the form of a bed state. Although it is not shown in the figure, there can be a form in which the baby carriage is pushed from the backside in the form of the bed state. Furthermore, as shown in FIG. 4, the baby carriage 1 stands by itself in a folded state by decreasing a dimension in its width direction. Since a mechanism for folding a baby carriage by decreasing its width direction is well known in the prior art, detailed illustration and description thereof will be omitted.

As shown in FIGS. 1 through 3, the baby carriage 1 comprises a body frame 10 constituting a carriage body, and a seat hammock 20 provided thereon. The body frame 10 includes a seating surface support member 11 supporting a seating surface and a pair of longitudinal side frame members 12 upwardly extending from both sides at a rear end of the seating surface support member 11. Lower ends of an inverted U-shaped push rod 13 are rotatably connected to the body frame 10. The baby carriage can be changed to be in the backside pushing state shown in FIG. 1 or to be in the face-to-face pushing state shown in FIG. 2 by changing the position of the push rod 13.

The seat hammock 20 includes a seating surface sheet portion 21 extending on the seating surface support member 11 of the body frame, a backrest sheet portion 22 connected to the rear edge of the seating surface sheet portion 21 and extending between the pair of longitudinal side frame members 12, and a pair of side surface sheet portions 23 rising from both side edges of the backrest sheet portion 22 and frontwardly extending.

Figure 10:
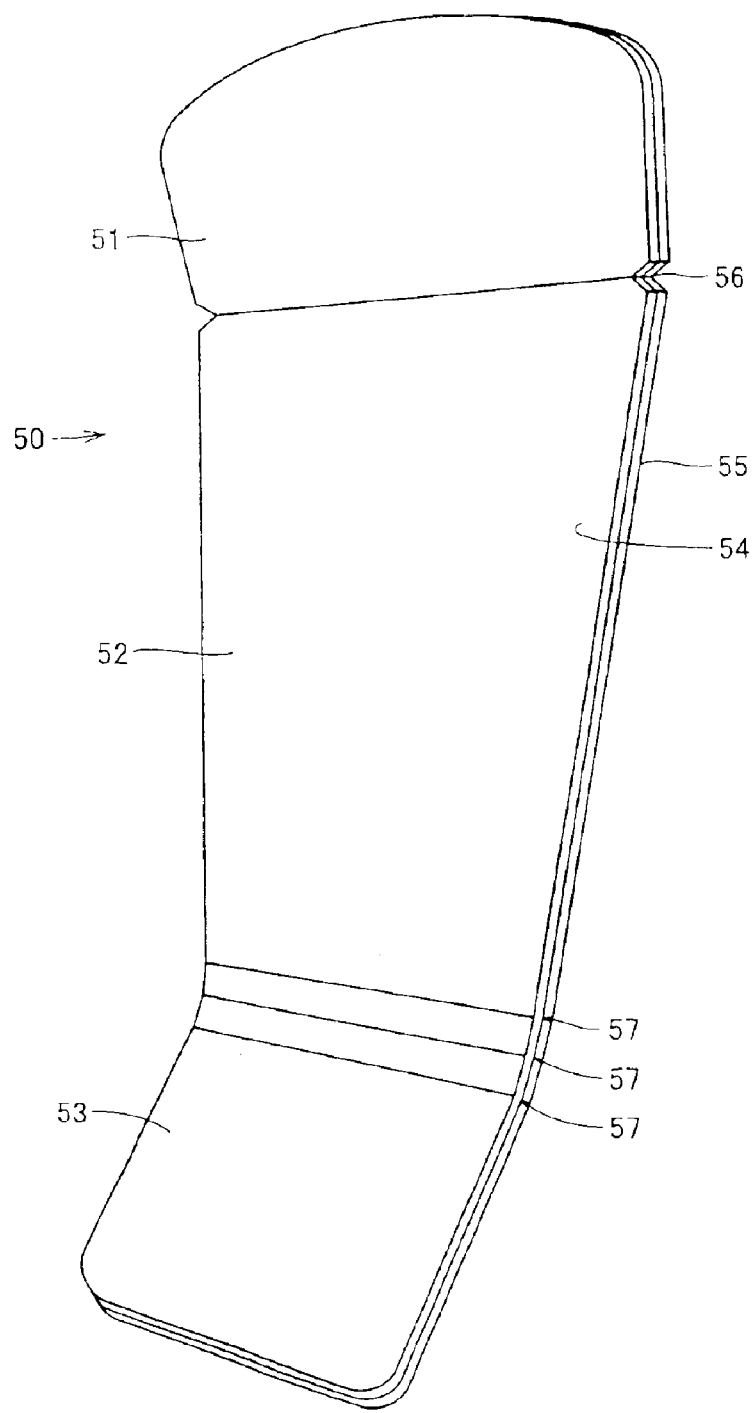
FIG. 10 is a perspective view showing a core material.

The backrest sheet portion 22 and the seating surface sheet portion 21 of the seat hammock 20 contain a sheet of contiguous flat plate-type core material 50 shown in FIG. 10. The core material 50 includes a hard resin plate 55 and a cushion material 54 attached thereon. The core material 50 is divided into three parts, that is, a head part core material 51, a back surface core material 52 and a seating surface core material 53.

Figure 11:
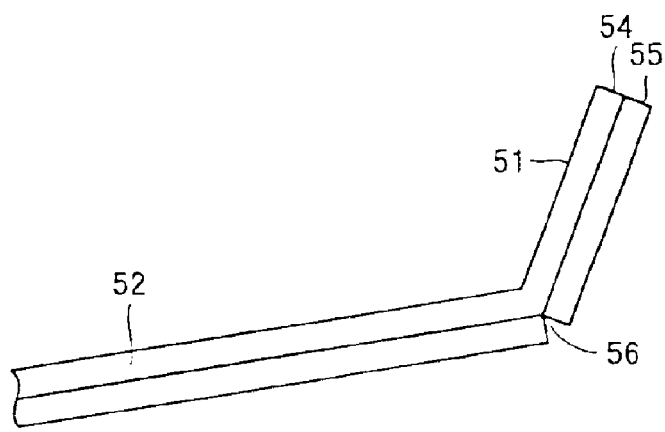
FIG. 11 is a side view showing a connecting part between a head part core material and a back surface core material.

As shown in FIG. 11, the head part core material 51 and the back surface core material 52 are connected so as to be able to be bended by virtue of a cut 56 provided in the resin plate 55 on the backside. A hinge for connecting them so as to be able to be bended is formed by a thin part of the resin plate 55, which was formed by cutting. In the state shown in FIG. 11, the head part core material 51 rises from the back surface core material 52. When the head part core material 51 is clockwise turned from this state so as to be on the same plane with the back surface core material 52, since the end face of the resin plate of the head part core material 51 abuts on the end face of the resin plate of the back surface core material 52, the state on the same plane for both parts can be stably maintained.

Figure 12:
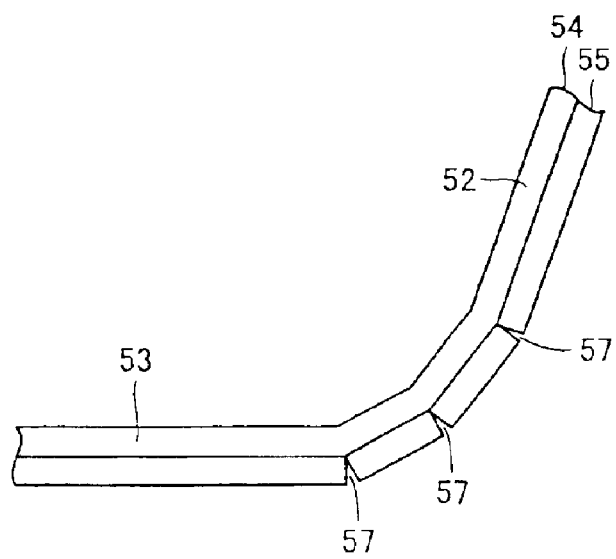
FIG. 12 is a perspective view showing a connecting part between the back surface core material and a seating surface core material.

As shown in FIG. 12, the back surface core material 52 and the seating surface core material 53 are connected so as to be able to be smoothly bended by virtue of three cuts 57 provided in the resin plate 55 on the backside. A hinge for connecting them so as to be able to be bended is formed by a thin part of the resin plate 55 formed by cutting. Since there are three cuts 57, the back surface core material 52 and the seating surface core material 53 are connected in a smoothly inflectional manner, thereby to stably support the hip of a baby in a large area.

Figure 16:
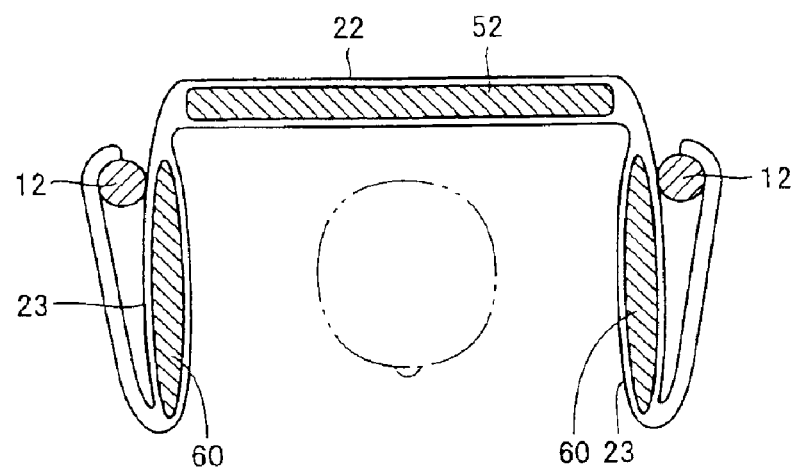
FIG. 16 is a sectional view showing a seat part of the baby carriage in the form of the chair viewed from the above.

As shown in FIG. 10, the back surface core material 52 and the head part core material 51 have a tapered shape which gradually becomes wider toward the upper portion. Preferably, the maximum width dimension part of the back surface core material 52 and the head part core material 51 ranges over the whole width dimension of the backrest seat portion 22 as shown in FIG. 16.

As described above, since the back surface core material 52 and the head part core material 51 are made wide and the seating surface core material 53 and the back surface core material 52 are constituted by one sequential sheet of the core material, a posture of the backrest seat portion 22 can be stably maintained even in the illustrated lightweight-type baby carriage 1.

According to the conventional lightweight-type baby carriage which is folded by narrowing in the width direction, in order not to disturb its folding operation, the seating surface core material and the back surface core material are separated and the width dimensions of those core materials are narrowed. While a baby is seated in the carriage, since the baby is restrained by the crotch belt and the waist belt, movement of the seating surface sheet portion is restrained. Meanwhile, since the backrest sheet portion is connected to the seating surface sheet portion only by a cloth of a hammock and the width dimension of the back surface core member is narrow, the backrest sheet portion is laterally swayed by vibration accompanied by movement of the baby carriage.

Meanwhile, according to the illustrated baby carriage 1, since especially the back surface core member 52 and the seating surface core member 53 are formed of one contiguous sheet of core material, the lateral sway of the backrest sheet portion 22 can be minimized as much as possible. This effect is further improved by widening the width dimension of the back surface core material 52 such that the back surface core material 52 ranges over the whole length of the width dimension of the backrest sheet portion 22.

Figure 17:
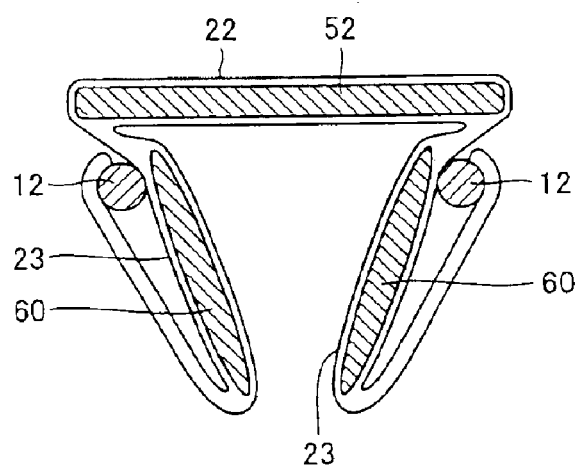
FIG. 17 is a sectional view showing a seat part of the folded baby carriage viewed from the above.

FIG. 16 shows a used state of the baby carriage 1 and FIG. 17 shows a folded state of the baby carriage 1. As can be seen by comparison between FIG. 16 and FIG. 17, in the folded state of the baby carriage, a distance between the pair of longitudinal side frame members 12 is narrowed. The back surface core material 52 occupies the whole length of the width dimension of the backrest sheet portion 22 in the used state shown in FIG. 16. In the folded state shown in FIG. 17, the backrest sheet portion 22 containing the back surface core material 52 is not bent in the width direction and positioned behind the pair of longitudinal side frame members 12. In such a folded structure, even if the width dimension of the back surface core material 52 is increased, that will not disturb the folding operation of the baby carriage which shrinks in the width direction.

As shown in FIG. 16, the pair of side surface sheet portions 23 includes protection pads 60 provided at positions corresponding to the height of the head of the baby seated. In the form of the chair state shown in FIGS. 1 and 16, the pair of side surface sheet portions 23 containing the protection pads 60 frontwardly extends beyond the pair of longitudinal side frame members 12. Meanwhile, in the form of the bed state shown in FIG. 3, the side surface sheet portions 23 containing the protect pads are positioned behind the pair of longitudinal side frame members 12. Thus, according to the illustrated baby carriage 1, in both forms of the chair state and the bed state, the head of the baby can be protected from an impact from the side.

Then, description will be made of a mechanism for making the transition from the form of the chair state shown in FIG. 2 to the form of the bed state shown in FIG. 3.

Figure 5:
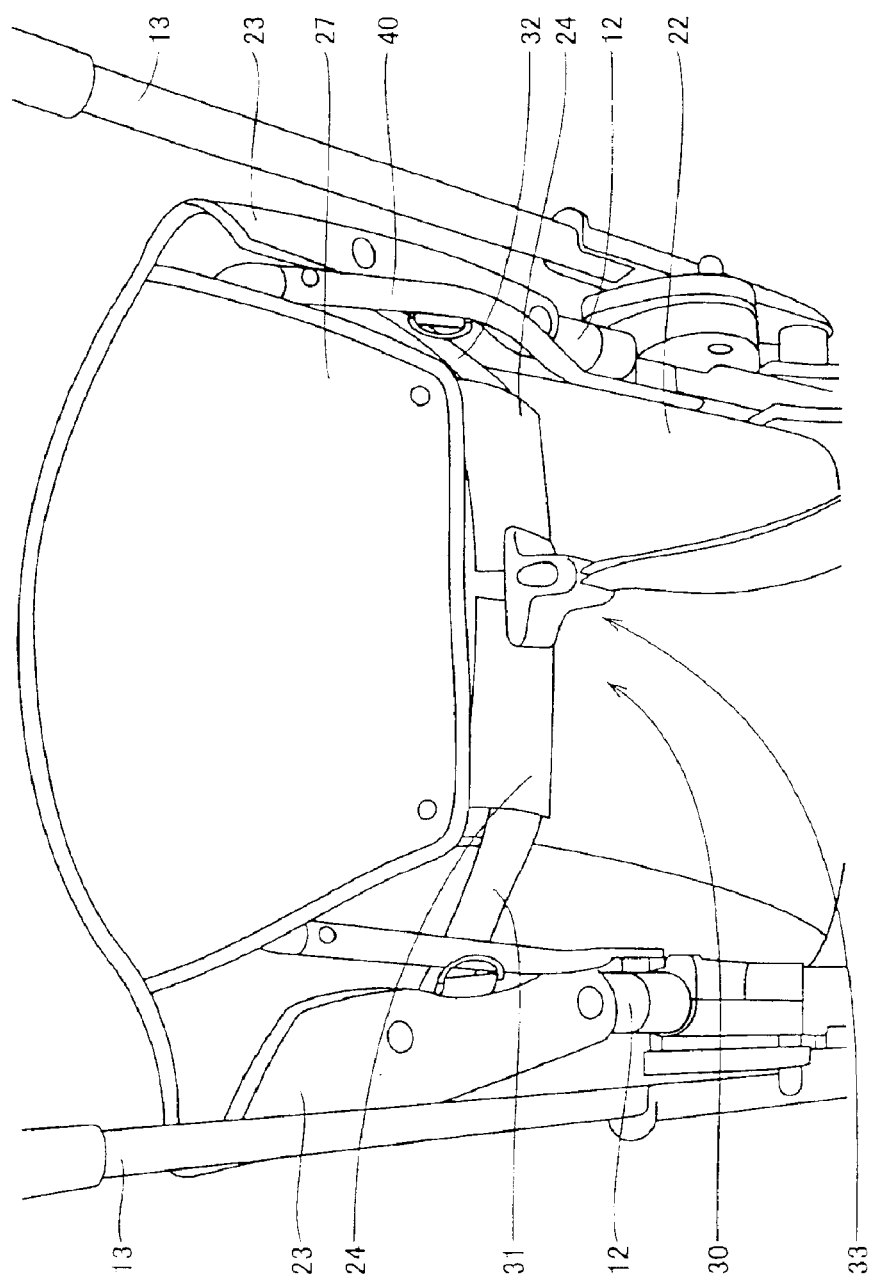
FIG. 5 is a perspective view showing a backside of the baby carriage.
Figure 6:
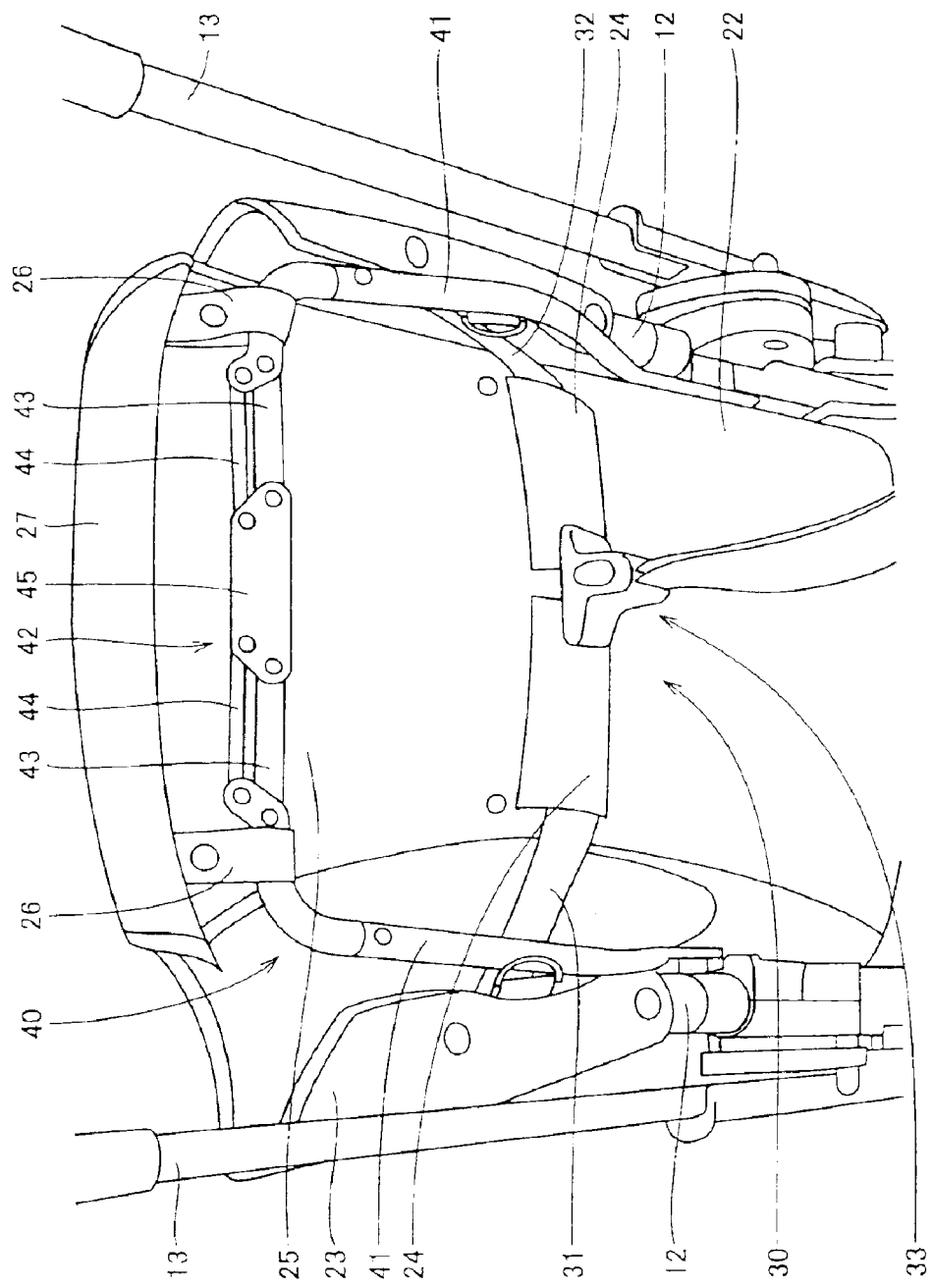
FIG. 6 is a perspective view showing the backside of the baby carriage and shows a state in which a cover member 27 is rolled up.
Figure 7:
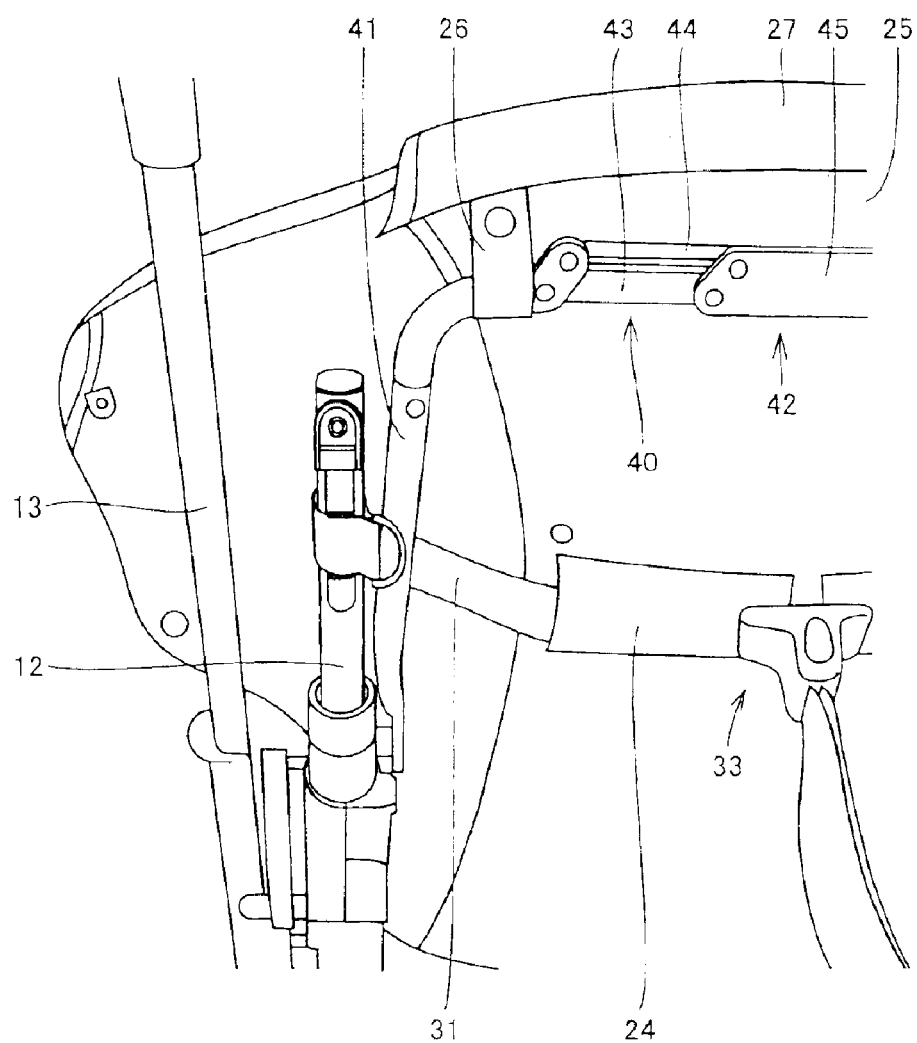
FIG. 7 is a perspective view showing the backside of the baby carriage and shows a state in which a side surface sheet portion 23 is separate from a longitudinal side frame member 12.

As can be clearly shown in FIGS. 5 through 7, the baby carriage 1 includes a backside support 30 connected to the body frame 10 so as to support the backrest sheet portion 22 from the backside in such a manner that it can be reclined. The backside support 30 will be described in detail with reference to FIGS. 5 through 7.

The backside support 30 includes a backside string member extending along the whole length of the backrest sheet portion 22 on the backside in the width direction and having both ends connected to the pair of longitudinal side frame members 12. The backside string member is constituted by right and left belts 31 and 32 and a lock member 33 in the illustrated embodiment of the present invention. Each of the right and left belts 31 and 32 has one end connected to each of the pair of longitudinal side frame members 12. A pair of guide sleeves 24 for passing the right and left belts 31 and 32 through is sewn on the backside of the backrest sheet portion 22 of the hammock. As shown in the figure, the right and left belts 31 and 32 passed through the guide sleeves 24 pass through the lock member 33.

Figure 13:
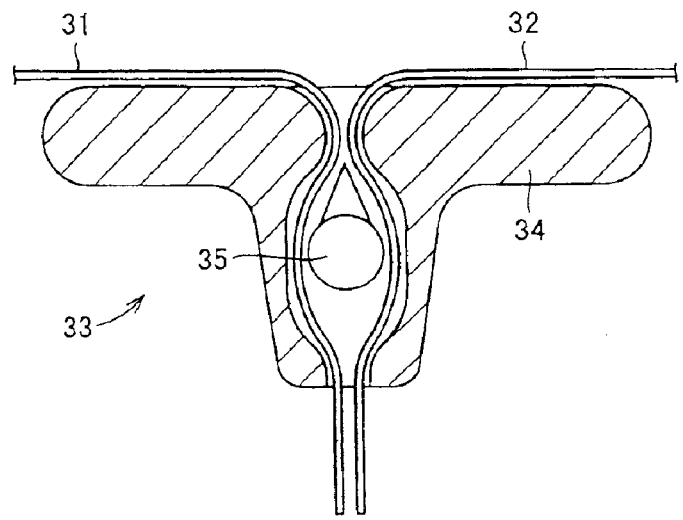
FIG. 13 is a plan view showing a backside support and shows a lock member in section.

As shown in FIG. 13, the lock member 33 comprises a case 34 and a wedge-shaped member 35 which is movable up and down. When load is applied to the backrest sheet portion 22 in the backward direction, force works so as to separate the right and left belts 31 and 32. At this time, however, the wedge-shaped member 35 of the lock member 33 and the case 34 cut into the right and left belts 31 and 32 to prevent the right and left belts from moving. Thus, the posture of the backrest sheet member 22 can be stably maintained by the backside support 30. In addition, there may be provided a spring for forcing the wedge-shaped member 35 and the case 34 always in the engaging direction.

When transition is made from the form of the chair state shown in FIG. 2 to the form of the bed state shown in FIG. 3, the wedge-shaped member 35 of the lock member 33 is only to be pinched by fingers and pulled down. When the wedge-shaped member 35 is pulled down, the wedge-shaped member 35 is released from the right and left belts 31 and 32, whereby the backrest sheet portion 22 can be easily tumbled backward. When the backrest sheet portion 22 is brought in a position of a desired angle of inclination, the wedge-shaped member 35 is released from the finger. Then, the wedge-shaped member 35 bites the right and left belts 31 and 32 by the load applied to the backrest sheet portion 22 to fix the position of the backrest sheet portion 22.

Figure 8:
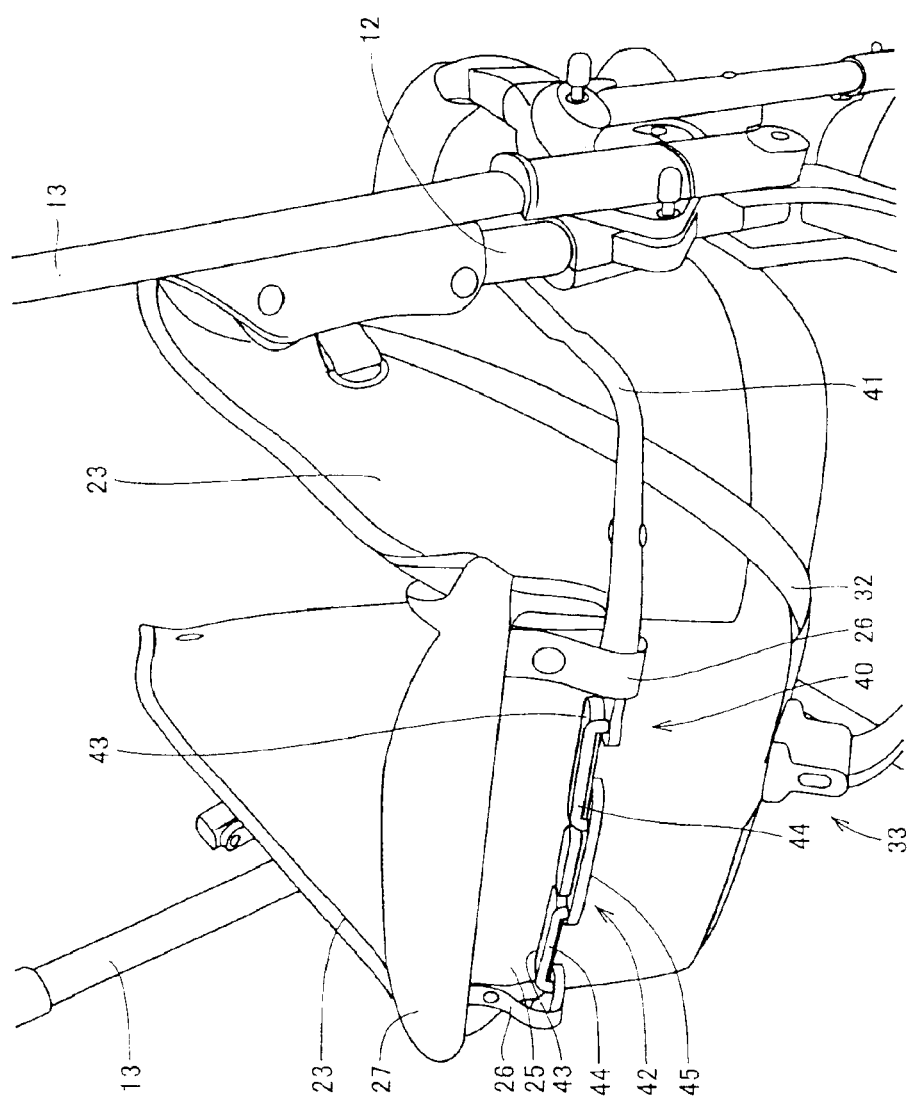
FIG. 8 is a perspective view showing the baby carriage viewed from backside in the form of the bed.

As shown in FIGS. 3 and 8, as the backrest sheet portion 22 is inclined backward until it becomes the form of the bed, an upper end region 25 of the backrest sheet portion 22 is inflected from the remaining backrest sheet portion and has a configuration to cover the top of a baby's head. This change in configuration can be attained by providing a guard member 40 of a rigid structure having an inverted U shape as a whole.

Referring to FIGS. 5, 6 and 7, the structure of the guard member 40 is described. FIG. 5 shows a state in which the side surface sheet portion 23 of the seat hammock 20 winds around the longitudinal side frame member 12 and fixed, and also shows a state in which a cover member 27 hanging from the upper edge of the seat hammock 20 covers up the central portion of the guard member 40. FIG. 6 shows a state in which the cover member is lifted. FIG. 7 shows a state in which the side surface sheet portion 23 is separated from the longitudinal side frame member 12.

Both ends of the inverted U-shaped guard member 40 are rotatably connected to the longitudinal side frame member 12. The central portion of the guard member 40 extending in the width direction is positioned along the back surface of the upper end region 25 of the backrest sheet portion 22. The upper end region 25 of the backrest sheet portion 22 rises upward from the backrest portion to form a head protection part for protecting the head of the baby when the seat takes the form of the bed state. As shown in FIG. 8, even when the seat is in the form of the bed state, the central portion of the guard member 40 is positioned along the back surface of the head protection part 25. In order to constantly keep close the central portion of the guard member 40 and the back surface of the head protection part 25, a guard connecting member 26 is mounted on the back surface of the head protection part 25. The central portion of the guard member 40 is held by the loop-shaped guard connecting member 26.

As shown in FIGS. 5 through 9, the guard member 40 comprises a pair of side bars 41 having lower ends rotatably connected to the body frame such as the longitudinal side frame member 12, and a lateral bar 42 rotatably connected to the pair of side bars 41. The reason why the side bars 41 and the lateral bar 42 are rotatably connected is that the baby carriage is enabled to be folded by shrinking in the width direction. Therefore, in a case of the baby carriage which does not shrink in the width direction, the side bars 41 and the lateral bar 42 may be integrally fixed.

Figure 9:
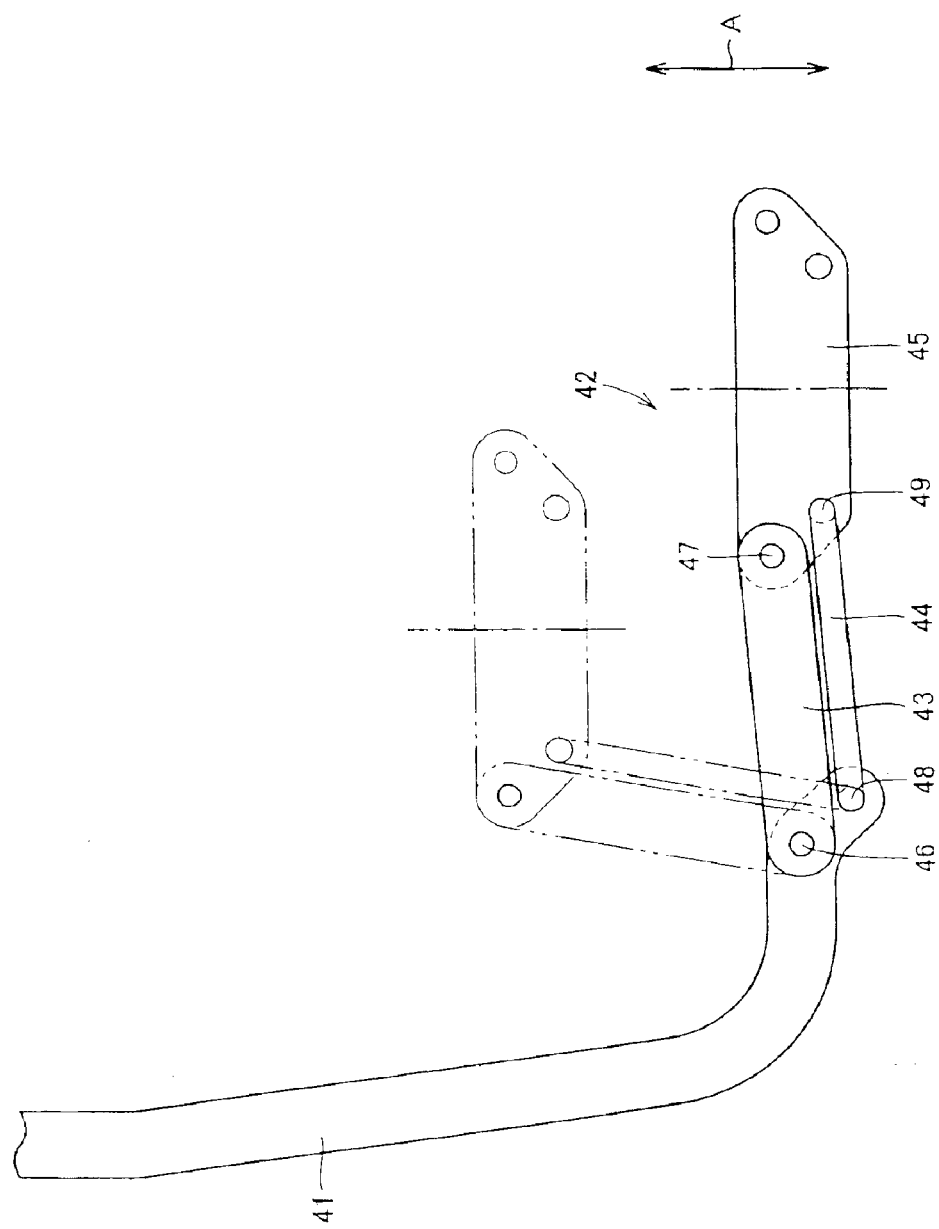
FIG. 9 is a view showing a guard member.

According to the illustrated embodiment, the lateral bar 42 has a flat configuration which is long in the extending direction of the side bars 41. More specifically, as shown in FIG. 9, the lateral bar 42 has the flat configuration which is long in the extending direction of the side bars 41, that is, in the direction shown by an arrow A and short in thickness in the direction vertical to a paper surface. When the seat is in the form of the chair state as shown in FIG. 6, a surface of the flat lateral bar 42 of the guard member 40 which is perpendicular to the thickness direction thereof is along the back surface of the head protection part 25. Meanwhile, when the seat is in the form of the bed state as shown in FIG. 8, a thickness part of the flat lateral bar 42 of the guard member 40 is along the back surface of the head protection part 25. Thus, since a part larger in width of the flat lateral bar 42 of the guard member 40 extends in almost horizontal direction in the form of the bed state, it shows sufficient strength to the impact in the forward and backward directions.

As can be clearly shown in FIG. 9, the lateral bar 42 of the guard member 40 includes a pair of end link members 43 and 44 rotatably connected to the pair of side bars 41 and a central link member 45 having both ends rotatably connected to the pair of end link members 43 and 44. According to the illustrated embodiment, the end link members include a plate-shaped first end link member 43 and a bar-shaped second end link member 44.

Figure 15:
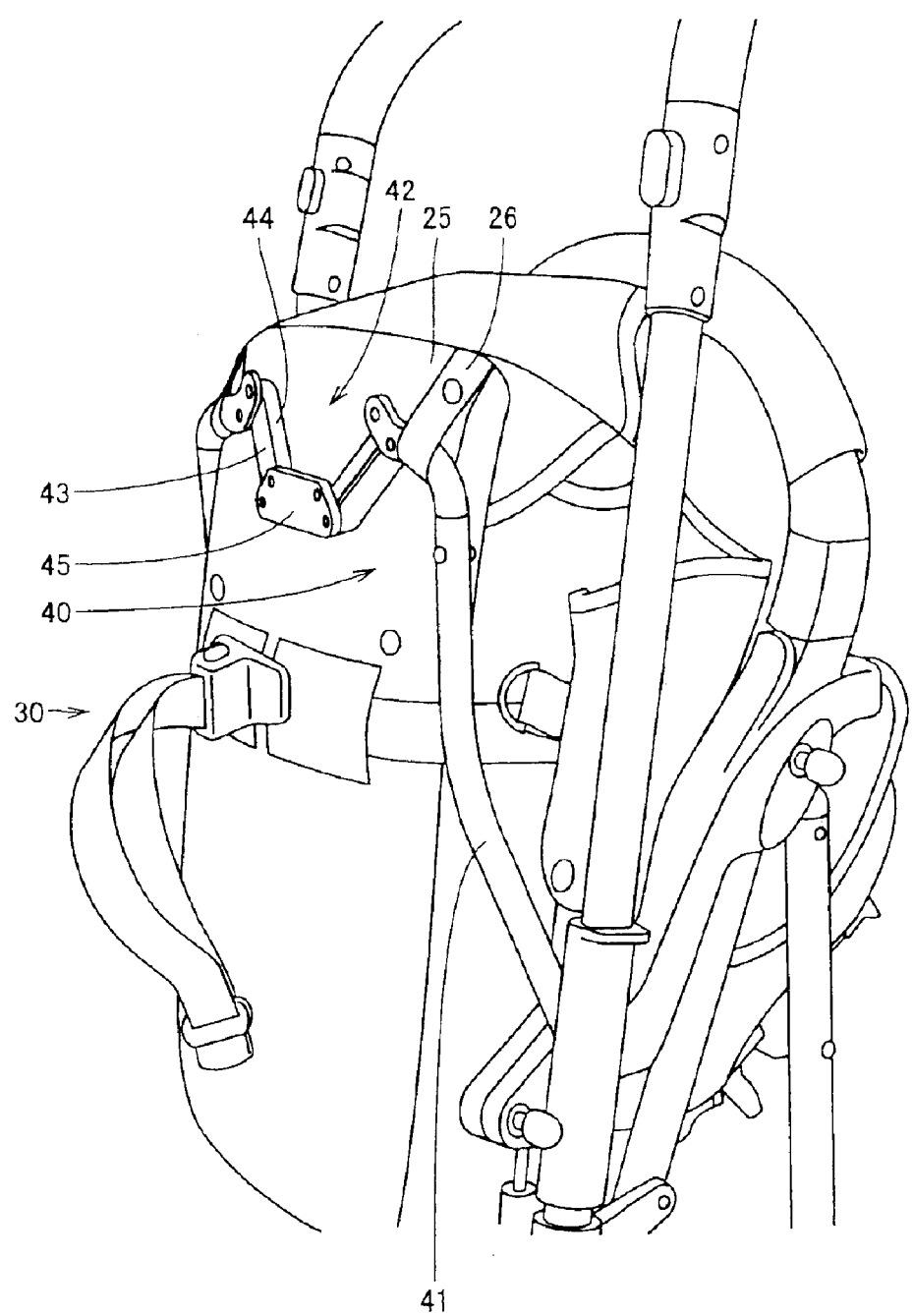
FIG. 15 is a perspective view showing a folded state of the baby carriage.

The first and second end link members 43 and 44 constitute a parallel four-section chain mechanism in order to move the central link member 45 in parallel along the back surface of the head protection part 25 during the folding operation as shown by imaginary lines in FIG. 9. In other words, four connection points 46, 47, 48 and 49 shown in FIG. 9 form a parallelogram. The folding operation of the baby carriage can be stabilized by using the parallel four-section chain mechanism. FIG. 15 shows a state in which the baby carriage is folded and stands by itself. In this folded state, the end link members 43 and 44 and the central link member 45 form a U-shaped configuration along the back surface of the head protection part 25.

According to the illustrated embodiment, the guard member 40 raises the head protection part 25 from the backrest portion when the seat is set in the form of the bed state. This operation is described with reference to FIG. 14.

Figure 14:
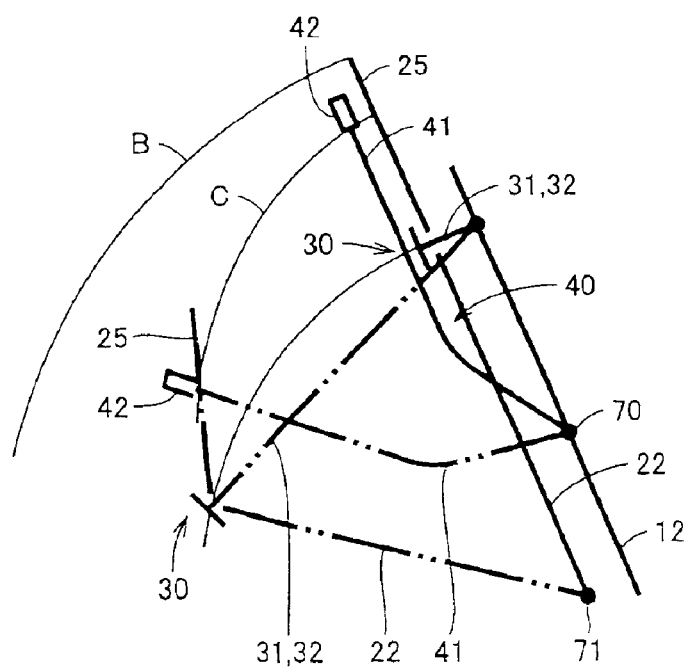
FIG. 14 is a view showing a frame format of the longitudinal side frame member, a backrest sheet portion, the backside support and the guard member.

In FIG. 14, the form of the chair state is shown by solid lines and the form of the bed state is shown by imaginary lines. In the chair state, the longitudinal side frame member 12 is almost parallel to the backrest sheet portion 22. The lower ends of the side bars 41 of the guard member 40 are rotatably connected to the longitudinal side frame member 12 at a connection point 70. The backrest sheet portion 22 can be bent at a bending point 71. The connection point 70 is positioned above the bending point 71.

The lateral bar 42 of the guard member 40 is positioned along the back surface of the head protection part 25 which constitutes an upper region of the backrest sheet portion 22. In the form of the chair, the head protection part 25 and the backrest sheet portion 22 are positioned on almost the same plane. A reclining angle of the backrest sheet portion 22 is decided by adjusting lengths of the belts 31 and 32 of the backside support 30.

When the seat is transformed from the chair state to the bed state, the upper end of the head protection part 25 moves along a circular orbit B centering on the bending point 71, while the lateral bar 42 of the guard member 40 moves along a circular orbit C centering on a connection point 70. A radius of the circular orbit C is smaller than that of the circular orbit B. Therefore, as shown by the imaginary lines in FIG. 14, when the belts 31 and 32 of the backside support 30 are extended to be in the form of the bed state, the head protection part 25 is raised upward by the lateral bar 42 of the guard member 40.

As shown in FIG. 8, when the seat is in the form of the bed state, the lateral bar 42 of the guard member 40 is positioned along the back surface of the head protection part 25 which rose from the backrest portion to protect the head of the baby, and the side bars 41 are positioned along the side surface sheet portions 23 to protect the temporal portion of the head of the baby.

Although one embodiment of the present invention was described in detail in the above with reference to the drawings, they are illustrative and various modifications and changes can be made. Some of those will be enumerated and described hereinafter.

(1) According to the illustrated embodiment of the present invention, the guard member had a function of rising the upper end region of the backrest sheet portion, that is, the head protection part in addition to the function of protecting the head of the baby in the form of the bed state. As its modification, another member may have the function of rising the head protection part instead of the guard member.

(2) According to the illustrated embodiment of the present invention, although the side bars and lateral bar of the guard member were rotatably connected to each other, the side bars and the lateral bar may be integrally fixed in a case of the baby carriage which does not shrink in the width direction when folded.

(3) According to the illustrated embodiment of the present invention, although the backside support comprised the backside string member extending along the whole length of the backrest sheet portion on the backside in the width direction and having both ends connected to the pair of longitudinal side frame members, the well-known reclining mechanism without the backside string member may be employed.

(4) According to the illustrated embodiment of the present invention, the push rod was rotatably provided so as to be changed to be in the backside pushing state or to be in the face-to-face pushing state. As its modification, the push rod may be fixed in a case of the baby carriage which is used only in the backside pushing state. In this case, a part of the push rod will constitute the longitudinal side frame member.

What is claimed is:

1. A baby carriage which can be changed to a form of a chair state in which a backrest portion and a head protection part positioned above the backrest portion extend on the same plane, or to a form of a bed state in which said head protection part rises upward from said backrest portion, comprising:

a body frame;

a backside support connected to said body frame so as to reclinably support said backrest portion from the backside; and a guard member of a rigid structure having an inverted U shape as a whole in which both ends thereof are rotatably connected to said body frame and a central portion thereof extending in a width direction is positioned along a back surface of said head protection part in both said forms of the chair state and the bed state;

wherein said baby carriage has a structure adapted to shrink by being folded in the width direction, said guard member includes a pair of side bars having end portions forming said ends rotatably connected to said body frame and lateral bar having two ends thereof connected respectively to said pair of side bars, and the lateral bar of said guard member includes a pair of end link members rotatably connected to said pair of side bars and a central link member having two ends thereof rotatably connected to said pair of end link members.

2. A baby carriage according to claim 1, wherein said body frame includes a seating surface support member and a pair of longitudinal side frame members upwardly extending from both sides at a rear end region of said seating surface support member, and said ends of said guard member are rotatably connected to said pair of longitudinal aids frame members of said body frame.

3. A baby carriage according to claim 2, further comprising:

a seat hammock including a seating surface sheet portion extending on said seat surface support member and a backrest sheet portion connected to a rear edge of said seating surface support member and extending between said pair of longitudinal side frame members; and a guard connecting member for connecting a backside of the upper region of said backrest sheet portion which is to be said head protection part to the central portion of said guard member, wherein said backside support reclinably supports said backrest sheet portion from the backside.

4. A baby carriage according to claim 3, wherein said backside support includes a backside string member extending along the whole length of the backside of said backrest sheet portion in the width direction and having both ends connected to said pair of longitudinal frame members.

5. A baby carriage according to claim 1, further comprising a push rod having lower ends rotatably connected to said body frame so as to be changed to be in a backside pushing state or to be in a face-to-face pushing state.

6. A baby carriage according to claim 1, wherein said lateral bar of said guard member has a flat configuration which is long in an extending direction of said side bars.

7. A baby carriage according to claim 1, wherein said end link members constitute a four-section chain mechanism which moves the central link member in parallel along the back surface of the head protection part.

8. A baby carriage according to claim 1, wherein said baby carriage has a foldable structure in which a pair of front wheels and a pair of rear wheels come near to one another in a forward and backward direction and in a lateral direction when said baby carriage is folded.

* * * * *

UNITED STATES PATENT AND TRADEMARK OFFICE
CERTIFICATE OF CORRECTION

PATENT NO. : 6,938,914 B2
DATED : September 6, 2005
INVENTOR(S) : Kassai et al

It is certified that error appears in the above-identified patent and that said Letters Patent is hereby corrected as shown below:

<u>Column 9,</u>
Line 35, before "lateral" insert -- a --,

<u>Column 10,</u>
Line 4, after "longitudinal" replace "aids" by -- side --.

Signed and Sealed this

Third Day of January, 2006

JON W. DUDAS
*Director of the United States Patent and Trademark Office*